United States Patent
Burrow et al.

(10) Patent No.: US 6,740,189 B1
(45) Date of Patent: May 25, 2004

(54) BUSINESS ACCESSORY ARTICLE WITH GRAPHIC IMAGE AND METHOD OF MAKING

(75) Inventors: Jimmie D. Burrow, Southlake, TX (US); Kenneth W. Hudson, Flower Mound, TX (US); Michael A. Kogutt, Irving, TX (US); Randy A. Kogutt, Dallas, TX (US); Kevin Anthony Leicht, Fort Worth, TX (US); Douglas E. Maxey, Highland Village, TX (US)

(73) Assignee: Dart Manufacturing Company, Dallas, TX (US)

( * ) Notice: Subject to any disclaimer, the term of this patent is extended or adjusted under 35 U.S.C. 154(b) by 101 days.

(21) Appl. No.: 09/656,258

(22) Filed: Sep. 6, 2000

(51) Int. Cl.⁷ .................. B32B 31/18; B32B 31/20; B32B 33/00; B32B 35/00
(52) U.S. Cl. .................. 156/256; 156/265; 156/272.2; 156/277
(58) Field of Search .................. 156/256, 265, 156/272.2, 277, 75.1, 240, 249, 250, 252, 270, 209, 219, 278, 308.2, 93.1, 230–241, 247, 379; 190/900, 901; 281/37, 29, 51; 283/64; 402/73

(56) References Cited

U.S. PATENT DOCUMENTS

| | | | | |
|---|---|---|---|---|
| 2,602,560 A | * | 7/1952 | Pargh | 156/378 |
| 2,747,646 A | | 5/1956 | Lippman | |
| 2,991,216 A | | 7/1961 | Hsu et al. | |
| 3,301,703 A | * | 1/1967 | Owen | 428/207 |
| 4,020,204 A | | 4/1977 | Taylor et al. | |
| 4,142,929 A | | 3/1979 | Otomine et al. | |
| 4,160,685 A | * | 7/1979 | Kuroda | 156/219 |
| 4,326,003 A | | 4/1982 | Bouhaniche | |
| 4,400,419 A | | 8/1983 | Laczynski | |
| 4,421,816 A | | 12/1983 | Arnold | |
| 4,440,590 A | | 4/1984 | Collins et al. | |
| 4,477,013 A | * | 10/1984 | Herrin | 229/67.1 |
| 4,482,598 A | | 11/1984 | Ishii et al. | |
| 4,510,006 A | | 4/1985 | Lawson | |
| 4,759,982 A | | 7/1988 | Jenssen et al. | |
| 4,773,953 A | | 9/1988 | Hare | |
| 4,778,547 A | * | 10/1988 | Becker et al. | 156/209 |
| 4,874,449 A | | 10/1989 | Schaefer et al. | |
| 4,981,386 A | * | 1/1991 | Beleckis | 402/73 |
| 5,073,222 A | | 12/1991 | Fry | |
| 5,328,535 A | | 7/1994 | Blanco | |
| 5,380,044 A | * | 1/1995 | Aitkens et al. | 52/731.8 |
| 5,441,589 A | * | 8/1995 | Groswith et al. | 156/542 |
| 5,589,022 A | | 12/1996 | Kuwahara | |
| 5,599,416 A | | 2/1997 | Kuwahara | |
| 5,691,020 A | | 11/1997 | Kondoh et al. | |
| 5,762,375 A | | 6/1998 | Kogutt et al. | |

(List continued on next page.)

OTHER PUBLICATIONS

Graphik Vinyl Products Co., 2000 Catalog, pp. 1, 6, 7, 61–63, date unknown.

*Primary Examiner*—Richard Crispino
*Assistant Examiner*—Chan Sing Po
(74) *Attorney, Agent, or Firm*—Gardere Wynne Sewell, LLP (57) ABSTRACT

An article such as a soft cover portfolio, or desk folder includes a graphic image thereon by transferring an image from a source to a processor which is operable to control a printer to print multiple images on a sheet of polyvinyl chloride or the like. The printed images may be protected by laminating a transparent vinyl sheet over the image sheet and the images are then precut to final size. The individual images are applied directly to the article or to a member used in forming an article by RF sealing the image to the member. The image may be supported on a debossing die or placed on the member wich will form the article, then struck by the debossing die.

24 Claims, 3 Drawing Sheets

U.S. PATENT DOCUMENTS

| | | | |
|---|---|---|---|
| 5,766,731 A | | 6/1998 | Stein et al. |
| 5,817,205 A | * | 10/1998 | Kaule .......................... 156/233 |
| 5,842,096 A | | 11/1998 | Mabbott |
| 5,891,552 A | * | 4/1999 | Lu et al. ..................... 101/487 |
| 5,961,150 A | | 10/1999 | Kogutt et al. |
| 5,974,230 A | * | 10/1999 | Jenkins ..................... 358/1.18 |
| 5,975,578 A | | 11/1999 | Mayer |
| 5,987,790 A | | 11/1999 | Sullivan |
| 6,016,913 A | | 1/2000 | Tilton |
| 6,022,440 A | | 2/2000 | Nordeen et al. |
| 6,042,914 A | | 3/2000 | Lubar |
| 6,277,228 B1 | * | 8/2001 | Fabrikant et al. ........... 156/219 |
| 6,319,349 B1 | * | 11/2001 | Lin ............................. 156/209 |

* cited by examiner

BUSINESS ACCESSORY ARTICLE WITH GRAPHIC IMAGE AND METHOD OF MAKING

FIELD OF THE INVENTION

The present invention pertains to an article of manufacture, such as a portfolio, desk folder, ring binder, wallet or similar business accessory article having an improved graphic image printed thereon by an image transfer process which includes transferring the image from a source image to a sheet of flexible material, such as vinyl, providing a protective coating or laminate over the image and adhering the image sheet to the article which may include a debossing operation.

BACKGROUND

Business accessory and gift articles, such as portfolios, desk folders, ring binders, wallets, luggage tags, keyfobs, memo pads and similar articles, are typically fabricated of a soft, durable material such as fabrics, vinyl, leather or other synthetic leather-like materials. The application of ornamental designs with graphic images or other pictorial features on the surface of the leather or synthetic leather-like material of the article is important and certain developments in the production of promotional and gift articles of the general type discussed above have been carried out. U.S. Pat. Nos. 5,762,375 and 5,961,150, both to Randy A. Kogutt and Michael A. Kogutt, and assigned to the assignee of the present invention, are directed to important advancements in the art of manufacturing articles of the type described herein. The subject matter of both of the above-mentioned patents is incorporated herein by reference in its entirety.

The above mentioned patents provide an article having a graphic image disposed in a "window" of the cover or other outer surface, for example, of an article such as a desk folder or portfolio as described in detail in the patents. However, such a "window" may also be provided as a raised or depressed surface of the material of the article and an image placed in the "window" by providing the image on a separate sheet of material and adhering the image sheet so provided to the material of the article within the "window". Alternatively, the window may be simultaneously formed with application of a sheet or substrate bearing the image to the material of the article which is to be decorated with the image.

There is also a desire in the manufacture of articles of the type in question to be able to conveniently provide a virtually infinite variety of images to be placed on the article and to make the images aesthetically pleasing and durable as well as economical to produce when applied to relatively large quantities of articles of the type in question. It is to these ends that the present invention has been developed.

SUMMARY OF THE INVENTION

The present invention provides an improved article of manufacture, such as a business accessory or gift item, including but not limited to a portfolio, desk folder, wallet, other articles mentioned hereinbefore or a similar article, which includes an improved graphic image placed thereon which is aesthetically pleasing, durable, inexpensive to manufacture and adapted to be easily produced in various quantities.

The present invention also provides an improved method of making an article of the type referred to hereinabove wherein a pre-selected graphic image is transferred to a flexible sheet or substrate. Single or multiple images may be transferred to the flexible sheet or substrate. If the images are relatively small, multiple images are printed on relatively large sheets of substrate material. Individual image sheets may then be cut out of the larger sheet preferably to the contours of the images themselves and are applied, respectively, to a surface of an article which is to bear the image, preferably using a debossing die and, preferably using radio frequency (RF) sealing or bonding of the image sheet to the surface of the article.

In accordance with one aspect of the invention a selected image may be generated by copying the image from a photograph or print of the image to a digital processor or computer wherein the image may be adjusted for size, quality and color and the adjusted image is then transferred one or multiple times to an image receiving sheet using a printer including, preferably, a multicolor inkjet type printer. However, a thermal ribbon printer or an electrostatic printer may also be used to provide single or plural images on the sheet. Individual image sheets are then cut out of a larger sheet bearing one or multiple images.

In accordance with another aspect of the invention an improved image is provided for application to an article of the type described herein, which image is provided on a sheet or substrate which is adapted to receive a graphic image in accordance with a method as described herein. The image is preferably provided on an opaque flexible sheet of material, such as polyvinyl chloride (PVC), having a suitable coating thereon to allow ink adherence, if required. For purposes of discussion herein, the term image "sheet" or image "substrate" refers to the underlying sheetlike member on which the image resides and one or more image sheets may be cut from a larger sheet of the same material on which one or more images are formed. Still further, the image sheet may be laminated with a clear vinyl overlay or provided with a transparent or "clear" coating to preserve the quality and durability of the image, all in accordance with the present invention.

In accordance with yet a further aspect of the invention, an article of the type described hereinabove is provided with an improved graphic image by adhering a prepared flexible sheet or substrate, including the image printed thereon, to a surface of the article using, preferably, radio frequency (RF) bonding or "welding" of the image sheet to the article. The bonding may take place on a surface of the article which has been previously lightly debossed, or the debossing may take place simultaneously with bonding of the image sheet to the article. A debossing die may be positioned in a so-called face up orientation to allow an operator to accurately place the image sheet on the debossing die. Alternatively, the debossing die may be operated in a face down orientation to lightly deboss the surface of the member to receive the image sheet whereby an indentation is provided to act as a guide for accurate placement of the image sheet on the surface of the article. Still further, other methods of accurately placing the image sheet on the surface of the article may be used, such as concentrated light beam "pointer" type guides or templates which can be used to place the image sheet accurately on the surface of the article and then moved out of the way prior to the step of sealing the image sheet to the member.

The image sheet is then permanently adhered or sealed to the member which will form at least part of the article preferably using a debossing die and an RF sealing apparatus. Accordingly, an important advantage of the present invention is that the process of adhering an image to an article of the type described herein permits decorating or adding images to previously completed products. Of course, image sheets may be adhered to larger sheets, such as the cover sheet of an article of manufacture and whereby the cover sheet is then further finished to complete the fabrication of the article. Accordingly, one advantage of the method of the present invention is that the image transfer or adherence process is adaptable for otherwise finished articles or for component parts of articles.

Those skilled in the art will further appreciate the above mentioned features and advantages of the invention together with other important aspects thereof upon reading the detailed description which follows in conjunction with the drawing.

DETAILED DESCRIPTION OF PREFERRED EMBODIMENTS

In the description which follows like components are marked throughout the specification and drawing with the same reference numbers, respectively. The drawing figures are not to scale and certain features may be shown in somewhat generalized or schematic form in the interest of clarity and conciseness.

Figure 1:
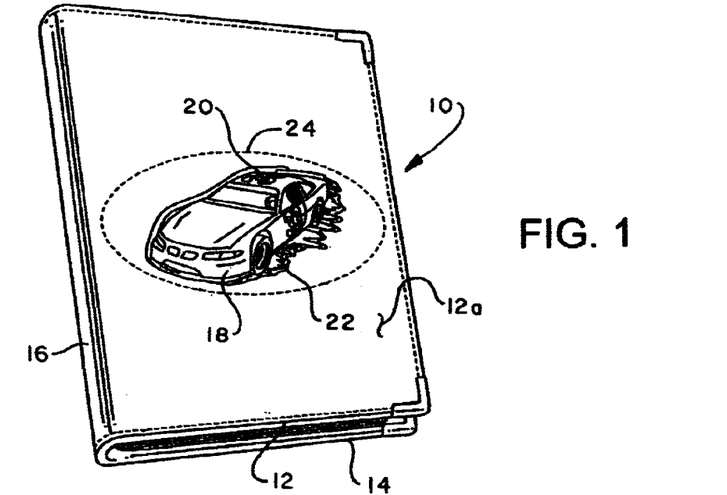
FIG. 1 is perspective view of an article bearing a graphic image in accordance with the process of the present invention.
Figure 2:
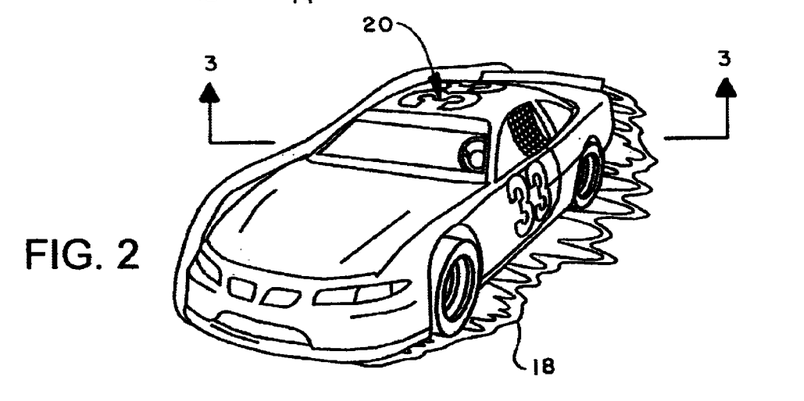
FIG. 2 is a plan view of an example of a graphic image printed on an image sheet or substrate and in accordance with the method of the invention.

Referring to FIG. 1, there is illustrated an article of manufacture in accordance with the present invention comprising, by way of example, a portfolio or desk folder, generally designated by the numeral 10. The portfolio 10 is characterized by front and back cover parts 12 and 14 which are hinged together at an integral spine portion 16, not unlike the front and back covers of a hardbound book. The front and back covers 12 and 14 may be moved between a folded or closed position and an open position. The portfolio 10 may be constructed generally in accordance with the portfolio described in U.S. Pat. No. 5,961,150 except, primarily, with regard to the configuration of a graphic image sheet 18, FIG. 1, bearing a graphic image 20 thereon and which has been applied to the outer surface 12a of a member making up at least the front cover 12, preferably in a window formed therein and generally designated by the numeral 22. The window 22 for the portfolio 10 may be a lightly debossed outline, impression, indentation in or a raised surface portion of surface 12a of the front cover 12 and may have an outline substantially corresponding to the outline of the image sheet 18 but slightly larger than such image sheet, at least along portions thereof. Additionally, the graphic image 20 may be further outlined by an outer decorative border 24 formed on the cover 12 and which may simulate stitching or other aesthetically pleasing indicia. FIG. 2 also illustrates the image sheet 18 and the graphic image 20 printed thereon in a plan view. The integral cover 12, 14 may be formed of one of a variety of flexible materials. However, polyvinyl chloride sheet is one useful and preferable example.

Figure 3:
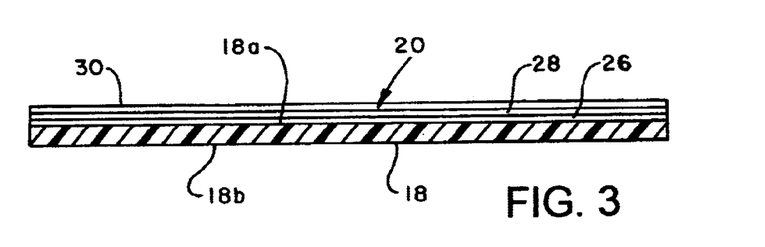
FIG. 3 is a detail section view of the image sheet of FIG. 2.

In accordance with this invention the material for the image sheet or substrate 18 may be furnished in rolls or precut sheets for processing in accordance with the invention and of a material such as polyvinyl chloride (PVC) flexible film having a thickness of about 4.0 mils to 12.0 mils and provided with an ink accepting coating 26, see FIG. 3, on at least one surface 18a thereof. The coating 26 may be of a type commercially available. The image sheet or substrate 18 is preferably an opaque precolored white sheet, although other colors may be provided or the image sheet may be translucent or transparent. A layer 28 of ink or other suitable material forming the image 20, FIG. 3, is applied to coated surface 18a of the sheet 18 in accordance with the invention. The sheet 18 may be calendared on one or both surfaces 18a and 18b, FIG. 3. Alternatively, an image enhancing or decorative texture can be added to the substrate or sheet 18 during a debossing process to be described further herein.

Referring further to FIG. 3, a transparent, image protecting overlay or laminate sheet 30 is provided and is, preferably, formed of thin (about 4.0 mils) clear polyvinyl chloride (PVC), with or without an adhesive backing. The laminate sheet 30 may be adhered to the image sheet 18 by adhesive bonding of the laminate sheet 30 to the coated and inked surface of the sheet 18. The laminate sheet 30 may be cold laminated to the sheet 18 by use of a suitable adhesive backing to the laminate sheet or the laminate sheet 30 may be hot laminated to the sheet 18 using suitable heated lamination rollers or the like. The ink forming the image layer 28 may be dye based or pigment based, although inks containing carbon black are generally not suitable for use with RF applications or bonding.

Figure 4:
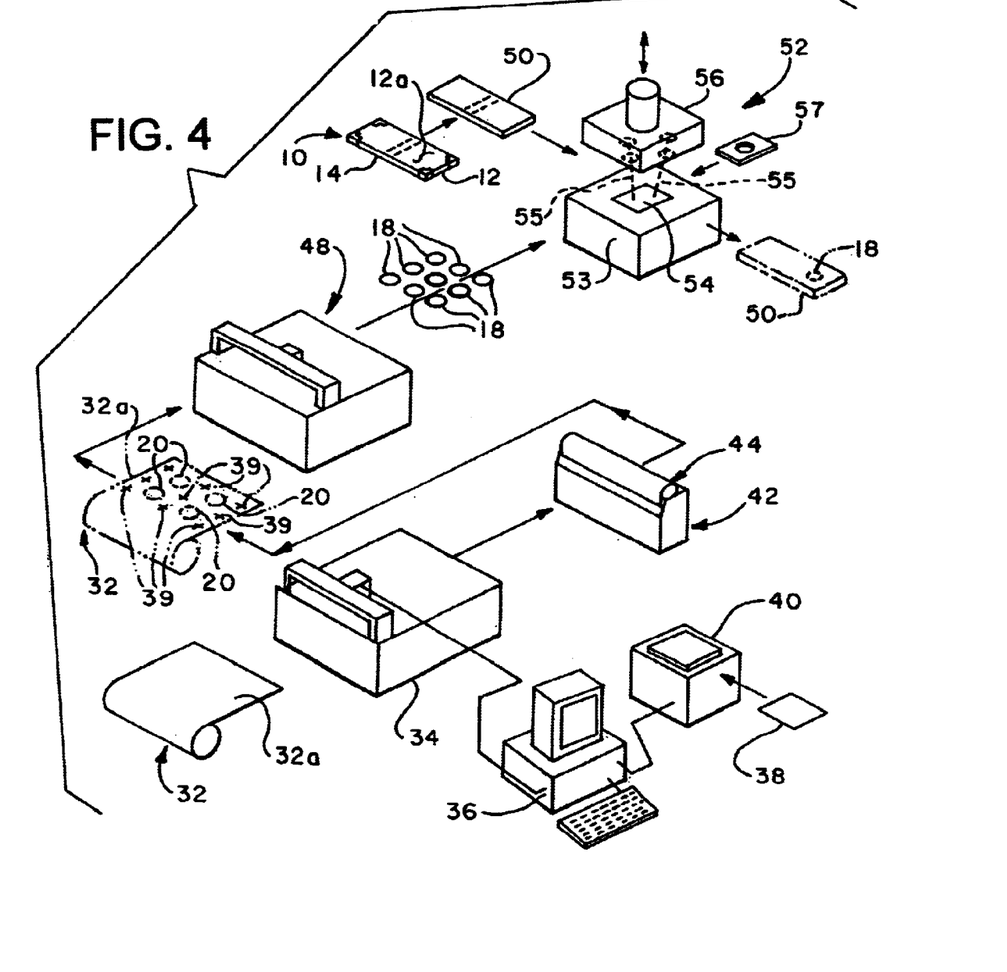
FIG. 4 is a schematic diagram showing certain steps in a process of the present invention.

Referring now to FIG. 4, there is illustrated in somewhat schematic form certain apparatus preferred for carrying out a process of providing the article 10 with the image 20 affixed thereto in accordance with the invention. FIG. 4 illustrates, by way of example, apparatus for transferring a graphic image to a sheet of material described above and comprising the image sheet 18, which material may be provided as a large sheet or as a roll, as indicated by numeral 32 in FIG. 4. The roll 32 of image sheet material is operable to be printed by a suitable printer 34 which may be controlled by a central processing unit or CPU 36 of a type commercially available. Color artwork comprising a photograph, print or other suitable image bearing article 38, particularly one having a light reflecting surface thereon may be copied and processed by programs residing on the CPU 36 and by use of a suitable electrostatic photocopier or scanner apparatus 40 to capture an image for processing by the CPU 36. The apparatus 40 is preferably of a type manufactured by Umax Technologies, Inc. as their model SMX3 color scanner. A commercially available raster image processing (RIP) program residing on the CPU 36 is operable to receive a digitized multicolor image from the scanner 40, from a storage medium, such as a diskette or via an email network. The RIP program is operable to separate the image into printable colors, such as cyan, magenta, yellow, black, green, orange, light cyan, and light magenta, for example, to provide accurate color matching and also match a broad range of Pantone Matching System colors. The RIP program may also be used to control the printer 34.

Figure 4A:
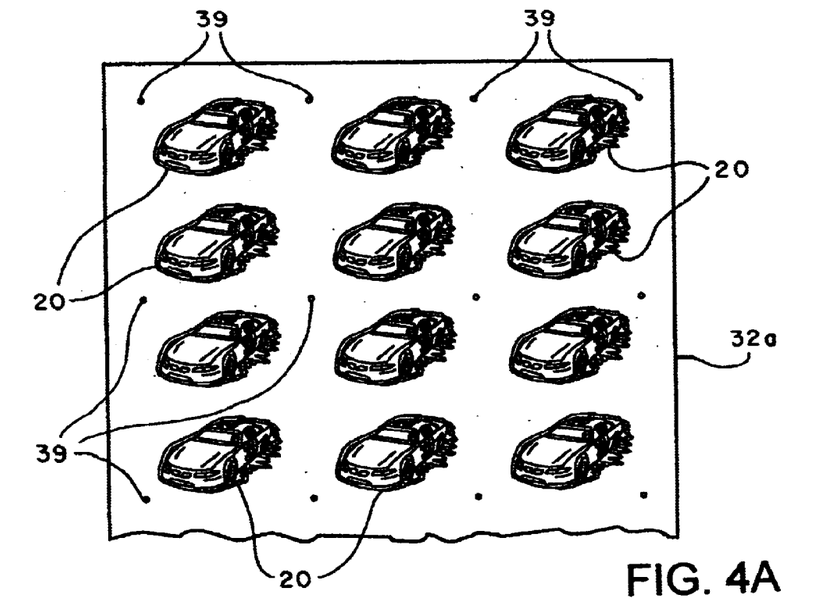
FIG. 4A is a detail plan view of a portion of a sheet of material having images and reference or guide marks thereon.

The printer 34 is preferably an inkjet printer, such as a model 3000 manufactured by Hewlett Packard Corporation, or a printer manufactured by Roland DGA Corporation as their Cammjet 500 printer/cutter, which is operable to print six colors on fifty-four inch wide media. However, the printer 34 may also be a thermal ribbon printer or an electrostatic printer, if desired. Multiple images, such as the image 20, may be printed on the sheet 32a of the roll of image sheet material 32 when installed on the printer 34 in a known manner. The roll of image sheet material 32 is, of course, according to the specification given hereinabove for the image sheet 18. Images of a minimal dots per inch (DPI) of 300 by 300 to 540 by 540 are preferred, but may be greater if higher resolution color quality is desired. The image 20 is also preferably printed to a desired size and shape on the sheet 32a together with suitable register or reference marks printed outside the image areas. The resulting register or reference marks are shown in the alternate position of the material roll 32 in FIG. 4 and in the detail view of FIG. 4A and are indicate by numerals 39, respectively. Multiple rows of images 20 are shown printed on sheet 32a.

It is preferable that the material of image sheet 18 be provided in rolls, such as the roll 32, without any backing or adhesive applied thereto. If necessary a backing sheet, not shown, can be accommodated if it is adhered to the image sheet 18 by static "cling" or an adhesive that allows the backing sheet to be easily removed and is compatible with radio frequency (RF) sealing processes. A graphic image provided on the image sheet 18 in accordance with the above described process produces a very high quality image as compared with other processes and is comparable to lithographic printing, for example.

It is also particularly desirable that the image sheet 18 provide an image that is waterproof, fade resistant and scratch resistant so that it requires no further surface coating or lamination. However, to insure image fade resistance and scratch resistance it is contemplated that the image sheet roll 32, after having a suitable number of images 20 printed thereon, be re-rolled and operably applied to a laminator or coating application apparatus, generally designated by the numeral 42 in FIG. 4. The laminator or coating apparatus 42 is adapted to support a roll 44 of the laminate sheet 30 as well as the roll 32 upon which images and register marks 39 have been printed. Material from the rolls 32 and 44 is then fed through the laminator or coating apparatus 42. A suitable laminator apparatus 42 may be of a type commercially available, such as a model 600 laminator available from Hunt Graphics Americas, Beacon Falls, Conn. for example. The clear laminate sheet 30, preferably backed with a permanent adhesive is applied very smoothly to the printed surface 18a of the image sheet 18 at an elevated temperature of about 180° F., for example, but may also be applied at lower temperatures in the range of 100° F. to 111° F. or even at room temperature. The clear polyvinyl chloride (PVC) laminate sheet 30 provides a protective barrier to the color image 20, minimizes fading from ultraviolet light sources, prevents scratching and provides water resistance.

After laminating, the image sheets 18, still in roll form on the roll 32, are transferred to a cutter apparatus 48, see FIG. 4, which may be controlled by a suitable processor to cut the outline of the image sheet 18 multiple times from the sheet 32a of roll 32. The optical register marks 39 are used as reference points for a suitable camera, not shown, mounted on the apparatus 48. Images of any desired shape may be cut in a very exacting manner. The apparatus 48 may be a microprocessor controlled cutter, such as a model M-800 manufactured by Zund North America Inc., Racine, Wis. which may be used to cut multiple images from sheet 32a, each residing on an image sheet 18, as shown in FIG. 4. Alternatively, such operations may be carried out by a printer/cutter available from Roland DGA as their Cammjet model 500.

The printed, protective laminated or coated (if required), and precisely cut images 20, each residing on its own image sheet 18, are now ready to be applied to a suitable article, such as a flexible member forming at least part of the cover 12, 14 of the portfolio 10, for example. The cover member for the portfolio 10 may also be fabricated of PVC, such as described in U.S. Pat. No. 5,961,150. Referring further to FIG. 4, a flexible PVC member comprising a portfolio cover sheet 50, which may form the outer surface of portfolio cover 12, 14, is illustrated. Alternatively, as shown in FIG. 4, a completed article, such as a portfolio 10 itself, may be unfolded and positioned for applying an image 20 and its associated image sheet 18 using a radio frequency (RF) sealing apparatus 52 as will be explained in further detail herein.

An image sheet 18 may be sealed to the cover member 50 (or directly to a finished article, such as cover 12 of portfolio 10) utilizing RF sealing apparatus 52 which includes a base 53 supporting a platen 54 and a head 56 which is movable relative to the platen to engage a debossing die with the member 50. The aforementioned debossing die may be provided with an outline of substantially the same shape as the image 20 and image sheet 18, but preferably slightly larger. For example, the outline of the debossing die may correspond to the "window" 22 shown in FIG. 1 and may be about 1/64 to 1/16 inch oversized with respect to the image sheet 18 around the perimeter of the image sheet. The debossing die may also be configured to provide the decorative border 24, if desired.

Referring further to FIG. 4, the portfolio cover sheet 50, or the portfolio 10 itself in an unfolded position, may be placed on the platen 54 using appropriate guide marks on the platen to locate the article. One or more focused light beams 55, for example, may be provided by suitable light sources, such as laser light sources mounted on or near the head 56, and directed onto the cover sheet 50 or the cover 12 of the portfolio 10 once it is in position on the platen 54 to serve as a guide for placing an image sheet 18 in the proper location on the article to which the image sheet is to be adhered. Alternatively, a suitable guide or template 57, FIG. 4, may be placed on the article, such as the sheet 50 or the portfolio cover 12, to serve as a locating guide for locating the image sheet 18 and its image properly on the article to which the image sheet is to be adhered. The guide 57 may be mounted adjacent the platen 54 and "flipped" into and out of a working position for use in locating the aforementioned image sheet 18 properly on the article to which the image sheet is to be adhered.

Figure 5:
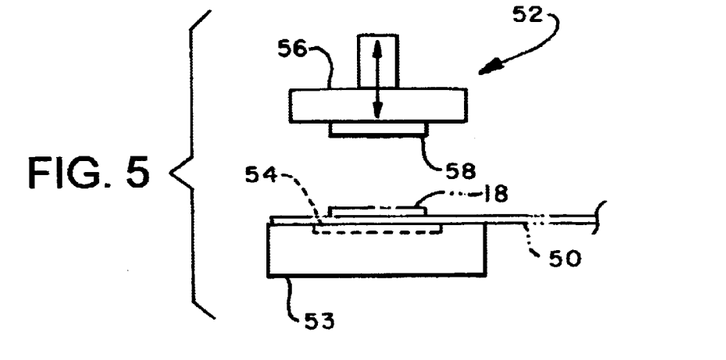
FIG. 5 is a somewhat schematic representation showing one orientation of a debossing die and associated workpieces in accordance with the invention.

FIG. 5 illustrates one preferred arrangement of the apparatus 52 wherein the platen 54 is supported on the base 53 of apparatus 52 and supports the cover member 50 (or the portfolio 10) and the image sheet 18. A debossing die, indicated by numeral 58, is suitably mounted on the head 56. This arrangement requires rather precise positioning of the member 50 and the image sheet 18 on the member 50 or other surface of the article to which the image is to be adhered. A template or guide marks, not shown, on the platen 54 may be used to precisely locate the member 50 relative to the platen and the head 56. Once the member 50 has been properly positioned on the platen 54, and the image sheet positioned on member 50, using one or more of the light beams 55 or the guide 57, for example, the head 56 is moved to forcibly engage the die 58 with the image sheet 18 and RF energy is applied to deboss the member 50 and seal or bond the image sheet 18 to the member 50.

Figure 6:
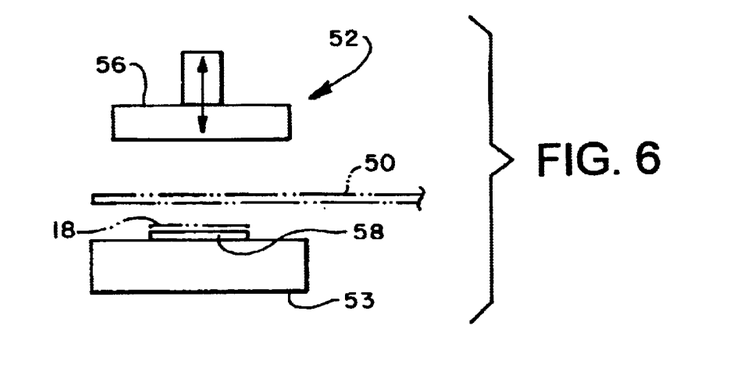
FIG. 6 is a somewhat schematic representation of an alternate die and workpiece arrangement according to the invention.

Alternatively, as shown in FIG. 6, the base 53 of the apparatus 52 may be adapted to support the debossing die 58, or a similar debossing die, and the image sheet 18 placed accurately on the die, as shown. The cover member 50 may then be located accurately with respect to the image sheet 18 and the head 56 actuated to forcibly engage the member 50 with the debossing die and the image sheet 18 followed by application of RF energy to suitably bond or seal the image sheet 18 to the cover member 50 and simultaneously deboss the cover member 50. The depth of debossing which creates the window 22 is preferably about equal to the thickness of the image sheet 18.

A third embodiment of the process of applying the image sheet 18 to the cover member 50 may be carried out with the arrangement according to FIG. 5 whereupon the cover member 50 is placed on the base 53 and supported by platen 54 and the head 56 is moved with the die 58 to lightly deboss a "window" or indentation in the cover member 50 followed by retraction of the head 56, placement of the image sheet 18 in the window or debossed indentation in the cover member 50 and then extension of the head 56 and die 58 into forcible engagement with the image sheet 18 and the cover member 50 to carry out the process of sealing the image sheet to the member 50 with a possibly further deepened or debossed "window" in the member to which the image sheet is securely adhered.

The debossing die 58 may include a textured surface or a layer of textured paper may be interposed the die and the image sheet 18 at the time of debossing the image sheet onto the member 50, for example, to provide an image enhancing or decorative texture to the image 20.

The RF sealing or bonding apparatus 52 may be of a type commercially available, such as manufactured by Cosmos Electronic Machine Co., Farmingdale, N.Y. or Thermex-Thermatron Co., Hauppauge, N.Y. The RF sealing process forms the debossed or indented "window" 22, for example, as shown in FIG. 1, as well as creating a very strong bond between the image sheet 18 and the vinyl cover member 50. The printed image substrate or sheet 18 together with the laminate sheet 30, if used, is thus permanently sealed to the member 50 or a similar member. The cover member 50 is then available for further decorating or fabrication into the portfolio 10, for example, or other article of manufacture, as desired. Of course, if the image sheets 18 are to be applied directly to an otherwise finished product, such as the portfolio 10, the image application process may be the last step in the manufacture of the article and the article is then ready for distribution. In this way, many types of articles, generally of the type described hereinabove, may be prefabricated and held in inventory until an order for a particular article bearing a particular image is received and the images are then applied directly to the otherwise finished articles using the process of the present invention whereupon the finished article is then ready for shipment to a customer.

Accordingly, the accurate positioning of the image sheet 18 is somewhat critical since it is required that it register very closely with the debossing die 58. In this regard, the process according to the arrangement of FIG. 6 may be preferred whereby an operator of the apparatus 52 may accurately position each image sheet 18 on the debossing die 58. The positional relationship between the debossed area or window 22 and the image sheet 18 is perhaps more critical than the positional relationship between the image sheet 18 and the cover member 50, for example. In other words positioning tolerances between the image sheet 18 and the cover member 50 may be as great as 0.125 inches without affecting the aesthetics or other preferred features of the final product, such as the portfolio 10. However, improper positioning between the image sheet 18 and the debossing die 58 will result in a poor quality, poorly adhered image and a mislocated border or outline of the window 22. The arrangement according to FIG. 5 may be suitable, however, if the debossing die 58 is first struck lightly against the cover member 50 and RF energy applied briefly to provide the lightly indented "window" 22 for subsequently receiving the image sheet 18 or if the other image sheet locating methods mentioned above are used.

Although a preferred material for the image sheet 18 is described hereinbefore, other materials may be used. For example, the material used for the image sheet, inlay or "windowpane" described in U.S. Pat. No. 5,961,150 may be also used as the image sheet or printed image substrate and applied to a member, such as a cover member 50, generally in the manner described above in conjunction with the bonding process carried out by the apparatus 52. The member comprising the cover member 50 may be quite flexible or somewhat rigid, but should be compatible with the material of the image sheet 18 to provide proper bonding, preferably by application of RF energy thereto.

Although preferred embodiments of an article of manufacture and a process of manufacturing same have been described in accordance with the present invention in sufficient detail to enable those skilled in the art to practice the invention, such artisans will appreciate that the embodiments described are not limiting and that various substitutions and modifications may be made to the article and process without departing from the scope and spirit of the appended claims.

What is claimed is:

1. A method of making an article with a printed image thereon, said article comprising one of a portfolio, desk folder, binder, wallet, luggage tag, memo pad or keyfob having a cover part formed of a flexible and indentable material, said method comprising the steps of:

providing a member formed of said flexible and indentable material and comprising at least a portion of said cover part of said article;

providing an image sheet of a flexible material to be bonded to said member;

printing an image on said image sheet on a first side thereof;

placing said image sheet in contact with said member at a second and opposite side of said image sheet;

bonding said image sheet to said member by pressing said image sheet to said member and applying RF energy to adhere said image sheet to said member; and debossing said member to form a planar indentation therein while bonding said image sheet to said member in said indentation, said planar indentation having a depth at least as great as the thickness of said image sheet so as to recess said image sheet in said member.

2. The method set forth in claim 1 including the step of:

cutting said image sheet from a larger sheet of the same material as said image sheet prior to placing said image sheet in contact with said member.

3. The method set forth in claim 2 including the step of:

printing said image on said image sheet as part of said larger sheet, said larger sheet comprising opaque precolored material, said printing comprising one of inkjet printing, photostatic printing, and thermal ribbon printing.

4. The method set forth in claim 3 including the step of:
providing an image from an image source by one of scanning and copying said image from said image source and transferring said image to a printing apparatus for printing said image on said image sheet.

5. The method set forth in claim 2 including the steps of:
printing multiple images on said larger sheet and cutting multiple image sheets from said larger sheet.

6. The method set forth in claim 5 including the step of:
laminating a transparent laminate sheet to said larger sheet over said images.

7. The method set forth in claim 6 including the step of:
providing said image sheet of polyvinyl chloride.

8. The method set forth in claim 7 including the step of:
providing said laminate sheet of polyvinyl chloride.

9. The method set forth in claim 1 including the step of:
applying an ink receptive coating on said image sheet prior to printing an image thereon.

10. The method set forth in claim 9 including the step of:
providing a textured surface of said image sheet prior to applying said coating on said image sheet.

11. The method set forth in claim 1 including the step of:
laminating a transparent laminate sheet onto said image sheet over said image.

12. A method of making an article with a printed image thereon, said article comprising one of a portfolio, desk folder, binder, wallet, luggage tag, memo pad or keyfob having a cover part formed of a flexible and indentable material, said method comprising the steps of:
providing a member formed of said flexible and indentable material and comprising at least a portion of said cover part of said article;
providing a sheet of flexible plastic material adapted to be receptive to multiple printed images on one side of said sheet of flexible plastic material;
transferring an image to be applied to said sheet of flexible plastic material to a processor;
causing said processor to control a printer for printing multiple images on said sheet of flexible plastic material;
cutting multiple image sheets from said sheet of flexible plastic material along predetermined contours of said images, respectively;
placing at least one of said image sheets in contact with said member; and
bonding said at least one image sheet to said member by engaging said at least one image sheet with a debossing die and applying RF energy to bond said at least one image sheet to said member at a planar indentation formed in said member whereby said at least one image sheet is disposed in a debossed planar window area formed in said member having a depth at least about equal to the thickness of said image sheet.

13. The method set forth in claim 12 including the step of:
debossing said member to form said indentation therein to provide a guide for locating said at least one image sheet on said member prior to placing said at least one image sheet in contact with said member.

14. The method set forth in claim 12 including the step of:
placing said at least one image sheet on said debossing die and placing said member over said at least one image sheet prior to bonding said at least one image sheet to said member.

15. The method set forth in claim 12 including the steps of:
locating a guide device on said member for guiding the placement of said at least one image sheet on said member and placing said at least one image sheet on said member in a predetermined position as provided by said guide device.

16. The method set forth in claim 12 including the step of:
directing at least one light beam on a predetermined location on said member for guiding the placement of said at least one image sheet on said member.

17. The method set forth in claim 12 including the step of:
laminating a flexible transparent sheet onto said sheet of flexible plastic material prior to cutting said image sheets from said sheet of flexible plastic material.

18. The method set forth in claim 17 including the step of:
providing said sheet of flexible plastic material and said transparent sheet of polyvinyl chloride, respectively.

19. The method set forth in claim 12 including the step of:
debossing said member to form said indentation therein while bonding said at least one image sheet to said member.

20. The method set forth in claim 12 including the step of:
providing said sheet of flexible plastic material and said member of polyvinyl chloride.

21. The method set forth in claim 12 including the step of:
applying an ink receptive coating on said sheet of flexible plastic material prior to printing images thereon.

22. A method of making an article with a printed image thereon, said article comprising one of a portfolio, desk folder, binder, wallet, luggage tag, or keyfob having a cover part formed of a flexible and indentable material, said method comprising the steps of:
providing a member formed of said flexible and indentable material and comprising at least a portion of said cover part of said article;
providing an image sheet of a flexible material to be bonded to said member;
printing an image on said image sheet on a first side thereof;
debossing said member to form a substantially planar indentation therein having a depth at least about equal to the thickness of said image sheet;
placing a second and opposite side of said image sheet in contact with said member within said indentation; and
bonding said image sheet to said member within said indentation by pressing said image sheet to said member and applying RF energy to adhere said image sheet to said member.

23. A method of making an article with a printed image thereon, said article comprising one of a portfolio, desk folder, binder, wallet, luggage tag, or keyfob having a cover part formed of a flexible and indentable material, said method comprising the steps of:
providing a member formed of said flexible and indentable material and comprising at least a portion of said cover part of said article;
providing an image sheet of a flexible material to be bonded to said member;
printing an image on said image sheet on a first side thereof;
providing a substantially planar debossing die and placing said image sheet on said debossing die placing said member in engagement with said image sheet at a second and opposite side of said image sheet; and bonding said image sheet to said member by pressing said image sheet and said member together while supported on said debossing die and applying RF energy to adhere said image sheet to said member while forming a substantially planar indentation in said member.

24. A method of making an article with a printed image thereon, said article selecting from a group consisting of a portfolio, desk folder, binder, wallet, and memo pad having a cover part formed of a flexible material, said method comprising the steps of:

providing a member formed of said flexible material and comprising at least a portion of said cover part of said article;

providing a sheet of flexible plastic material adapted to be receptive to multiple printed images on one side of said sheet of flexible plastic material;

transferring an image to be applied to said sheet of flexible plastic material to a processor;

causing said processor to control a printer for printing multiple images on said sheet of flexible plastic material;

cutting multiple image sheets from said sheet of flexible plastic material along predetermined contours of said images, respectively;

placing at least one of said image sheets in contact with a substantially planar surface of said member; and bonding said at least one image sheet to said member by engaging said at least one image sheet with a substantially planar die and applying RF energy to bond said at least one image sheet to said member whereby a substantially planar image is presented on said member.

* * * * *